US012675318B2

(12) United States Patent
Arumugam Maharaja

(10) Patent No.: US 12,675,318 B2
(45) Date of Patent: Jul. 7, 2026

(54) SYSTEM AND METHOD FOR DYNAMIC TASK SCHEDULING

(71) Applicant: Bank of America Corporation, Charlotte, NC (US)

(72) Inventor: Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 930 days.

(21) Appl. No.: 17/718,692

(22) Filed: Apr. 12, 2022

(65) Prior Publication Data

US 2023/0325234 A1      Oct. 12, 2023

(51) Int. Cl.
*G06F 9/48* (2006.01)
*G06F 9/50* (2006.01)

(52) U.S. Cl.
CPC .......... *G06F 9/4881* (2013.01); *G06F 9/5016* (2013.01)

(58) Field of Classification Search
CPC .............................. G06F 9/4881; G06F 9/5016
See application file for complete search history.

(56) References Cited

U.S. PATENT DOCUMENTS

| | | |
|---|---|---|
| 4,852,001 A | 7/1989 | Tsushima et al. |
| 4,896,269 A | 1/1990 | Tong |
| 5,093,794 A | 3/1992 | Howie et al. |

| | | |
|---|---|---|
| 5,361,362 A | 11/1994 | Benkeser et al. |
| 5,442,730 A | 8/1995 | Bigus |
| 5,978,830 A | 11/1999 | Nakaya et al. |
| 7,024,671 B2 | 4/2006 | Yamashita |
| 7,076,781 B2 | 7/2006 | Skovira |
| 7,233,792 B2 | 6/2007 | Chang |
| 7,605,931 B2 | 10/2009 | Sato et al. |
| 7,626,717 B2 | 12/2009 | Rai et al. |
| 7,721,290 B2 | 5/2010 | Horikawa |
| 7,810,093 B2 | 10/2010 | Jones et al. |
| 7,861,246 B2 | 12/2010 | Lu et al. |
| 7,958,507 B2 | 6/2011 | Santos et al. |
| 7,958,508 B2 | 6/2011 | Shimizu et al. |
| 7,978,355 B2 | 7/2011 | Suzuki et al. |
| 8,020,161 B2 | 9/2011 | Markov |
| 8,023,133 B2 | 9/2011 | Kaneko |

(Continued)

FOREIGN PATENT DOCUMENTS

WO          2020173553 A1      9/2020

*Primary Examiner* — Hiren P Patel

(57) ABSTRACT

A system for dynamically scheduling tasks accesses a plurality of tasks. The system determines execution attributes associated with the plurality of tasks. The execution attributes impact an execution of the plurality of tasks. The system determines device attributes associated with devices that are tasked to execute the plurality of tasks. The device attributes impact the execution of the plurality of tasks and a performance of the devices. The system determines that a first task is scheduled to be executed. The system determines that by scheduling the first task, at least one of the execution attributes and device attributes is not optimized. The system creates a second task that comprises at least a subset of operations of the first task based on the execution attributes and device attributes. The system scheduled the second task to be executed according to scheduling rules such that the execution attributes and device attributes are optimized.

20 Claims, 3 Drawing Sheets

(56)  References Cited

U.S. PATENT DOCUMENTS

| | | | |
|---|---|---|---|
| 8,166,484 B2 | 4/2012 | Kawato | |
| 8,205,208 B2 | 6/2012 | Mausolf et al. | |
| 8,266,477 B2 | 9/2012 | Mankovskii et al. | |
| 8,276,146 B2 | 9/2012 | Dawson et al. | |
| 8,453,152 B2 | 5/2013 | Druyan et al. | |
| 8,610,909 B2 | 12/2013 | Miyata | |
| 8,615,677 B2 | 12/2013 | Barsness et al. | |
| 8,627,322 B2 | 1/2014 | Chaudhry et al. | |
| 8,732,720 B2 | 5/2014 | Verma et al. | |
| 8,869,158 B2 | 10/2014 | Prabhakar et al. | |
| 8,869,164 B2 | 10/2014 | Bobroff et al. | |
| 9,069,610 B2 | 6/2015 | Chakravorty et al. | |
| 9,098,351 B2 | 8/2015 | Bell, Jr. et al. | |
| 9,128,763 B2 | 9/2015 | Sarkar et al. | |
| 9,128,775 B2 | 9/2015 | Weinman, Jr. | |
| 9,141,430 B2 | 9/2015 | Cherkasova et al. | |
| 9,152,467 B2 | 10/2015 | Cadambi et al. | |
| 9,342,376 B2 | 5/2016 | Jain et al. | |
| 9,367,357 B2 | 6/2016 | Cadambi et al. | |
| 9,430,288 B2 | 8/2016 | Wilson et al. | |
| 9,442,760 B2 | 9/2016 | Boutin et al. | |
| 9,612,878 B2 | 4/2017 | Di Balsamo et al. | |
| 9,684,546 B2 | 6/2017 | Bach et al. | |
| 10,007,445 B2 | 6/2018 | Nithrakashyap et al. | |
| 10,257,275 B1 * | 4/2019 | Dirac | H04L 67/1097 |
| 10,324,757 B2 | 6/2019 | Picinich et al. | |
| 10,331,483 B1 | 6/2019 | Warman et al. | |
| 10,509,683 B2 * | 12/2019 | Furman | G06F 9/5061 |
| 10,579,423 B2 * | 3/2020 | Li | G06F 9/5005 |
| 11,093,298 B2 | 8/2021 | Davidson et al. | |
| 11,544,113 B2 * | 1/2023 | Wang | G06F 9/5011 |
| 11,966,776 B2 * | 4/2024 | Amarnath | G06F 9/4881 |
| 12,014,217 B2 * | 6/2024 | Mitra | G06N 20/00 |
| 12,204,830 B2 * | 1/2025 | Du | G06F 30/27 |
| 12,265,914 B2 * | 4/2025 | Desaulniers | G06F 18/2113 |
| 2003/0085888 A1 * | 5/2003 | Lafruit | G06F 9/5027 |
| | | | 345/419 |
| 2007/0100469 A1 * | 5/2007 | Falsi | G06F 11/3696 |
| | | | 700/11 |
| 2013/0139170 A1 * | 5/2013 | Prabhakar | G06F 9/4893 |
| | | | 718/104 |
| 2014/0089889 A1 * | 3/2014 | Maclay | G06F 8/35 |
| | | | 717/104 |
| 2016/0203404 A1 * | 7/2016 | Cherkasova | G06N 5/04 |
| | | | 706/12 |
| 2017/0208144 A1 * | 7/2017 | Zhang | G06F 11/3495 |
| 2019/0303200 A1 | 10/2019 | Sitaraman et al. | |
| 2019/0303207 A1 * | 10/2019 | Vadapandeshwara | G06F 9/5038 |
| 2020/0326979 A1 | 10/2020 | Seshiah | |
| 2021/0011762 A1 | 1/2021 | Lin et al. | |
| 2021/0099542 A1 * | 4/2021 | Watt | H04L 41/0836 |
| 2022/0091883 A1 * | 3/2022 | Gadre | G05B 19/41865 |
| 2022/0137901 A1 * | 5/2022 | Kobashi | G06F 3/1256 |
| | | | 358/1.14 |
| 2022/0350708 A1 * | 11/2022 | Vishwakarma | G06F 11/1458 |
| 2022/0366320 A1 * | 11/2022 | Liu | G06N 3/0442 |
| 2023/0141807 A1 * | 5/2023 | Groenewegen | G06F 8/33 |
| | | | 717/106 |
| 2023/0168925 A1 * | 6/2023 | Makaya | G06F 11/302 |
| | | | 718/102 |

* cited by examiner

SYSTEM AND METHOD FOR DYNAMIC TASK SCHEDULING

TECHNICAL FIELD

The present disclosure relates generally to task scheduling, and more specifically to a system and method for dynamic task scheduling.

BACKGROUND

Within an organization, users request multiple tasks to be executed by one or more computer systems. Each task is scheduled to be executed at a fixed time. The scheduling of each task is static, meaning that once it is set it is not revised. Over time, other tasks may be added to the pipeline of tasks. In such cases, the computer systems become overloaded with tasks.

SUMMARY

The system described in the present disclosure is particularly integrated into a practical application of improving the processing and memory utilization of computer systems tasked to execute multiple tasks. This, in turn, leads to improving the processing and memory resources allocations of the computer systems. Thus, the processing and memory resources of the computer systems are allocated more efficiently to perform the tasks. These practical applications provide several technical advantages, including improving the underlying operation of the computer systems tasked to execute the tasks and improving the efficiency in task executions. These practical applications and technical improvements are described below.

The present disclosure contemplates systems and methods configured to implement dynamic task scheduling. In an example scenario, users may initiate a large number of tasks to be executed by one or more devices. For example, a task may be related to software application development, web application development, mobile application development, a service provided by an organization to its clients, a product provided by the organization to its clients, and/or any other task associated with the operation of the organization.

One approach for scheduling the tasks is to schedule each task statically in a pipeline. In this approach, each task may be scheduled at a fixed time and be executed at a fixed time every day. Another approach for scheduling the tasks is batch processing, where multiple tasks are scheduled to be executed concurrently. However, these approaches suffer from several technical drawbacks.

In batch processing, the tasks are scheduled statically, meaning that each task is executed at a fixed time along with other tasks. The scheduling of the tasks is not updated or revised dynamically based on changes in time constraints of the tasks, processing, and memory requirements, among other factors that impact the execution of the tasks. Some tasks may include querying a database and accessing a particular data table in the database. Some tasks may include accessing a particular data file at a server. In some cases, certain data, files, or data tables may be called or accessed for multiple tasks. This will cause an increase in incoming access requests at task executing devices (e.g., servers and databases). Thus, the task executing devices will be overloaded with access requests. This may slow down their operation and reduce processing and memory resource performance, utilization, and availability of the task executing devices.

In some cases, this may cause a delay in the completion of tasks due to a delay in accessing and retrieving a required data, file, or data table. In some cases, a task may be scheduled to be executed at a particular time. Over time, other tasks may be added to be executed at or near the particular time. However, the task executing device may have available processing and memory resources before the particular time to execute the task. In current scheduling technology, the task may wait to be executed at a particular time. But since other tasks are added to be executed at the same or near the particular time, the execution and completion of the tasks may be delayed due to overloading the task executing device and occupying most of the processing and memory resources at the task executing device.

The present disclosure provides technical solutions to these technical problems and contemplates a system that is configured to implement dynamic task scheduling according to scheduling rules such that execution attributes and device attributes are optimized. The scheduling rules may include a time gap between every two adjacent tasks not to be more than a threshold time gap, a memory resource utilization by executing each task not to be less than a threshold memory resource utilization, a processing resource utilization by executing each task not to be less than a threshold processing resource utilization, a completion time delay of each task not to be more than a threshold time delay, and a load balancing parameter at the device(s) not to be more than a threshold percentage. The execution attributes with respect to each task may include time constraints, time requirements, access requirements to various data needed to perform the respective task, dependencies to other tasks, processing resource requirements to perform the respective task, memory resource requirements to perform the respective task and any other information that impacts the execution of the respective task. The device attributes may include processing resource availability and memory resource availability with respect to one or more devices that are tasked to perform the tasks.

Accordingly, the disclosed system is integrated into a practical application of improving the processing and memory utilization of computer systems tasked to execute multiple tasks. For example, the disclosed system dynamically schedules the tasks so that a load balancing parameter at the task executing devices is less than a threshold percentage (e.g., less than 90%, 95%, etc.). In this way, the task executing devices are not overloaded with access requests and task executions.

Furthermore, by determining the processing and memory resource requirements for each task and processing and memory availability in each task executing device, each task can be allocated to a task executing device such that the efficiency in memory and processing resource allocations in the task executing device is improved. For example, a task may be allocated to a particular task executing device that has available processing and memory resources to perform the task. In another example, each task executing device is not overloaded with too many tasks that it is not able to execute—meaning load balancing at each task executing device is optimized.

In one embodiment, a system for dynamic task scheduling comprises a memory and a processor. The memory is configured to store a plurality of tasks comprising a first task, where the first task comprises a first set of operations, and a set of scheduling rules that indicates requirements for scheduling each of the plurality of tasks. The processor is operably coupled with the memory. The processor is configured to access the plurality of tasks. The processor determines a plurality of execution attributes associated with each of the plurality of tasks, where the plurality of execution attributes impacts an execution of each of the plurality of tasks. The processor determines a plurality of device attributes associated with one or more devices that are tasked to execute the plurality of tasks, where the plurality of device attributes impacts the execution of each of the plurality of tasks and a performance of the one or more devices. The processor determines that the first task is scheduled to be executed. The processor determines that by scheduling the first task, at least one of the plurality of execution attributes and the plurality of device attributes is not optimized. In response to determining that by scheduling the first task, at least one of the plurality of execution attributes and the plurality of device attributes is not optimized, the processor creates, based at least in part upon the plurality of execution attributes and the plurality of device attributes, a second task that comprises at least a subset of the first set of operations. The processor schedules the second task to be executed according to the set of scheduling rules such that the at least one of the plurality of execution attributes and the plurality of device attributes is optimized.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
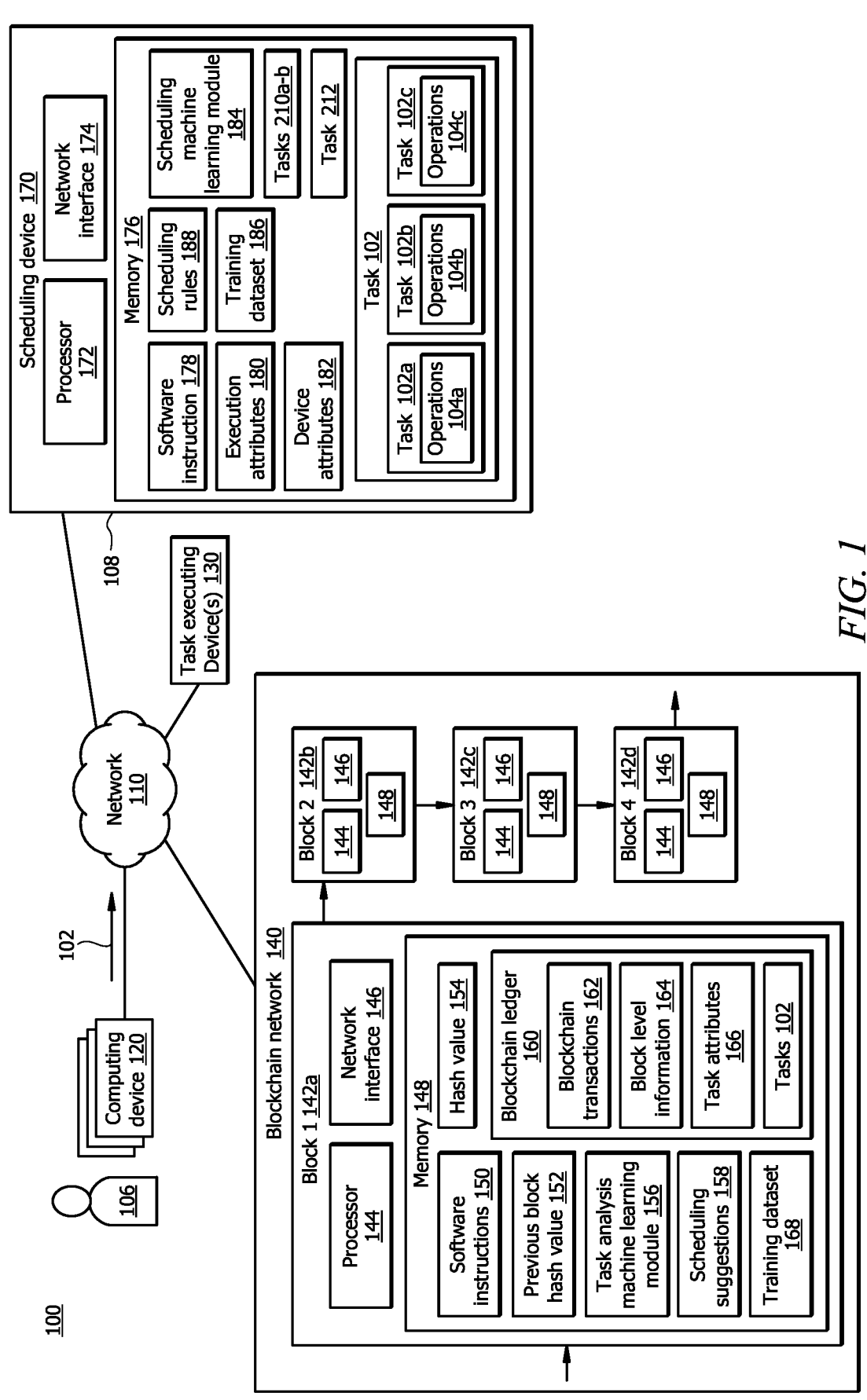
FIG. 1 illustrates an embodiment of a system configured to implement dynamic task scheduling.
Figure 2:
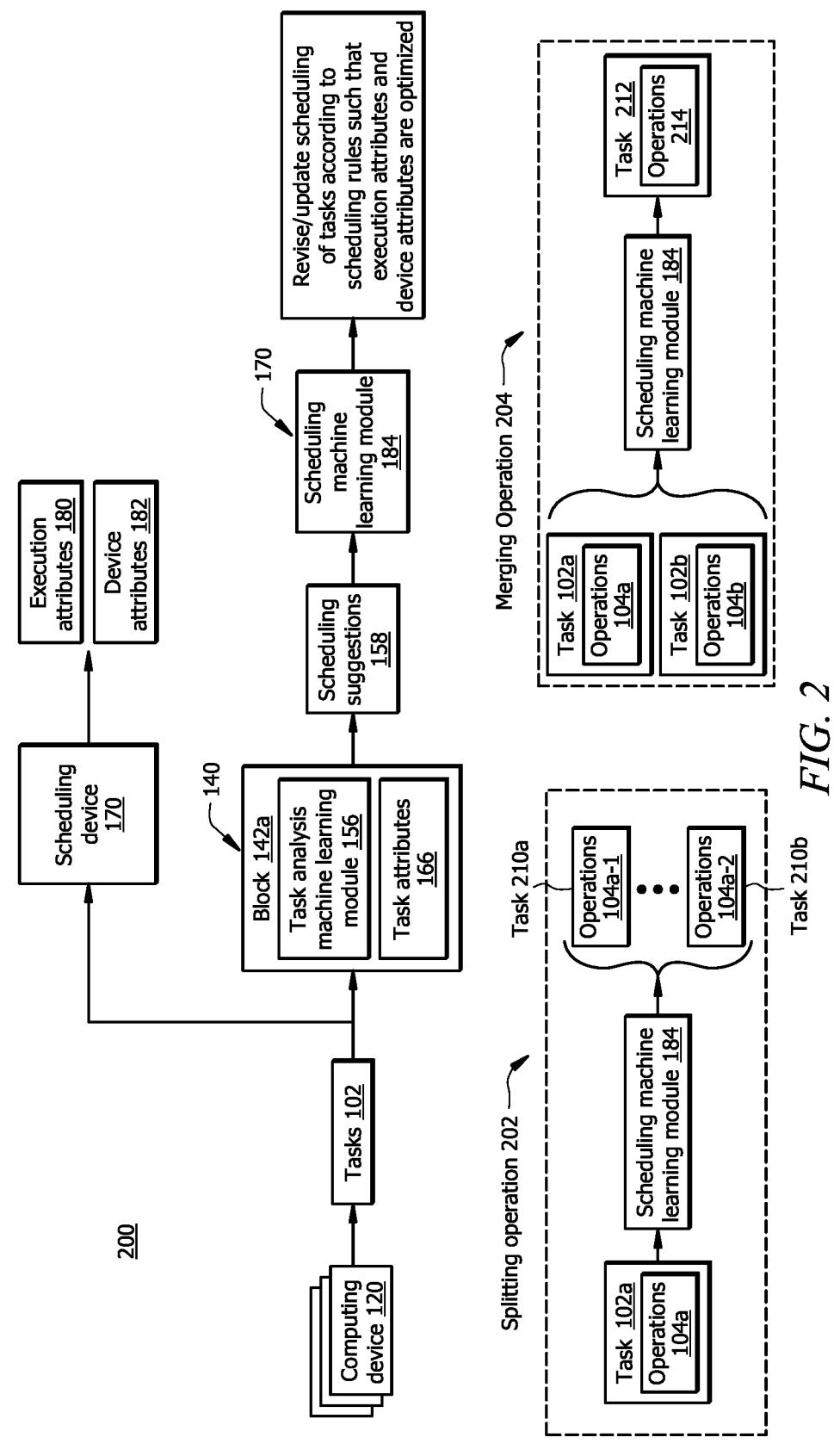
FIG. 2 illustrates an example operational flow of system of FIG. 1 for implementing dynamic task scheduling.
Figure 3:
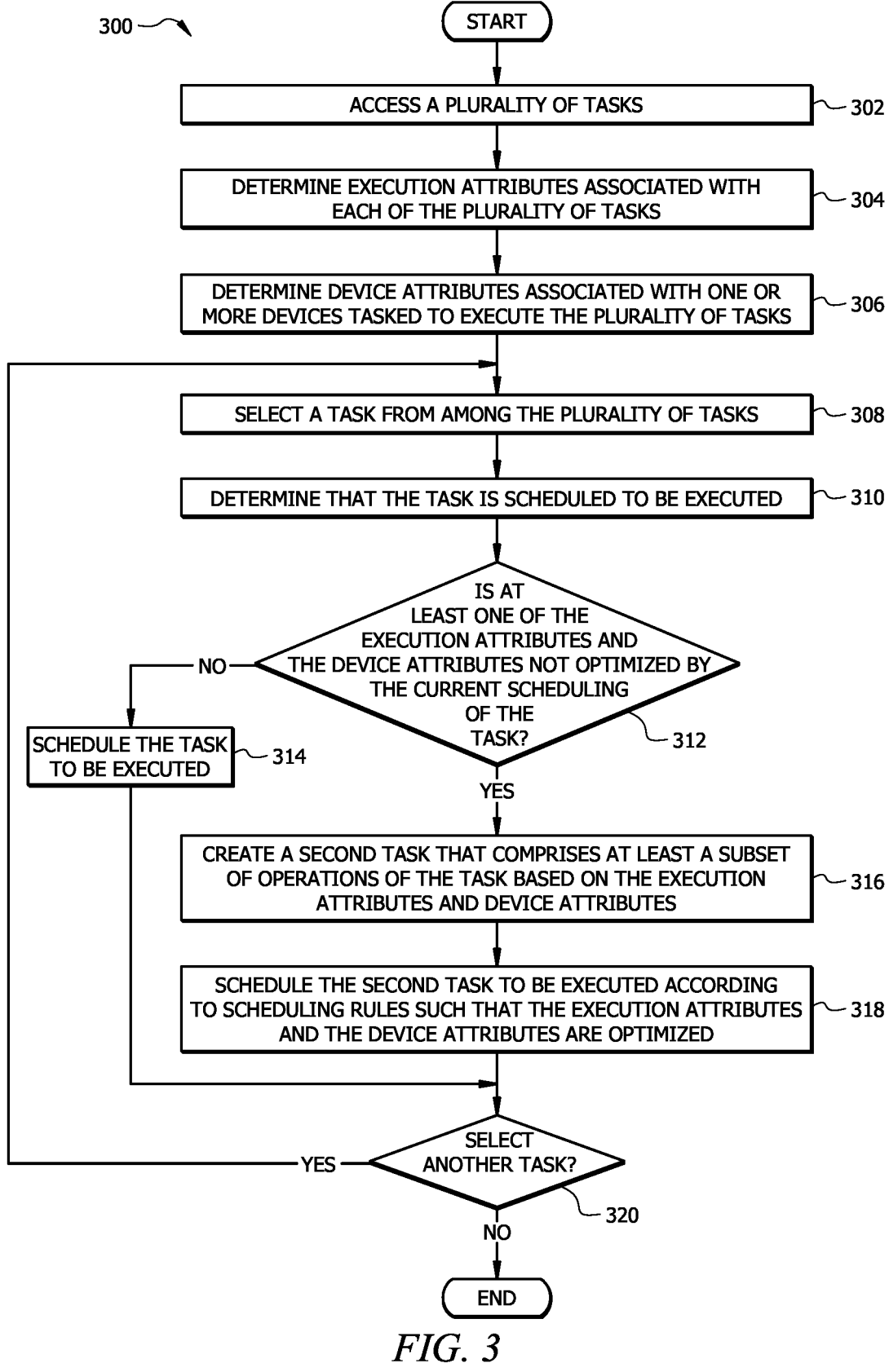
FIG. 3 illustrates an example flowchart of a method for dynamic task scheduling.

As described above, previous technologies fail to provide efficient and reliable solutions to provide a secure and reliable process for implementing dynamic task scheduling. Embodiments of the present disclosure and its advantages may be understood by referring to FIGS. 1 through 3. FIGS. 1 through 3 are used to describe a system and method for implementing dynamic task scheduling.

System Overview

FIG. 1 illustrates an embodiment of a system 100 that is generally configured to implement dynamic task scheduling. In certain embodiments, system 100 comprises a scheduling device 170 communicatively coupled with one or more computing devices 120, task executing devices 130, and a blockchain network 140 via a network 110. Network 110 enables the communication between components of system 100. The blockchain network 140 includes a plurality of blocks 142 (such as blocks 142a-d). Each block 142 may store a record in a distributed ledger 160 that is distributed among the blocks 142. The scheduling device 170 comprises a processor 172 in signal communication with a memory 176. Memory 176 stores software instructions 178 that when executed by the processor 172 cause the scheduling device 170 to perform one or more functions described herein. For example, when the software instructions 178 are executed, the scheduling device 170 dynamically schedules tasks 102 according to scheduling rules 188 such that execution attributes 180 and device attributes 182 are optimized. In other embodiments, system 100 may not have all of the components listed and/or may have other elements instead of, or in addition to, those listed above.

In an example scenario, users 106 may initiate a large number of tasks 102 to be executed by one or more devices 130. Each task 102 may have a number of operations 104. Task 102a may have a number of operations 104a, task 102b may have a number of operations 104b, and task 102c may have a number of operations 104c. For example, a task 102 may be related to software application development, web application development, mobile application development, a service provided by an organization 108 to its clients, a product provided by the organization 108 to its clients, and/or any other task 102 associated with the operation of the organization 108.

One approach to schedule the tasks 102 is to schedule each task 102 statically, e.g., one after another. In this approach, each task 102 may be scheduled at a fixed time and be executed at the fixed time every day. Another approach to schedule the tasks 102 is batch processing, where multiple tasks 102 are scheduled to be executed concurrently. However, these approaches suffer from several technical drawbacks. In batch processing, the tasks are scheduled statically, meaning that each task is executed at a fixed time along with other tasks. The scheduling of the tasks is not updated or revised dynamically based on changes in time constraints of the tasks, processing and memory requirements, processing and memory availabilities, execution delays, among other factors that impact the execution of the tasks. Some tasks 102 may include querying a database (e.g., one of the devices 130) and accessing a particular data table at the database. Some tasks 102 may include accessing a particular data file at a server (e.g., one of the devices 130).

In some cases, certain data, files, or data tables may be called or accessed for multiple tasks 102. This will cause an increase in incoming access requests at task executing devices 130. Thus, the task executing devices 130 will be overloaded with access requests. This may slow down their operation, and reduce processing and memory resource performance, utilization, and availability of the task executing devices 130. In some cases, this may cause a delay in the completion of task 102 due to a delay in accessing and retrieving a required data, file, or data table.

In some cases, a task 102 may be scheduled to be executed at a particular time. Over time, other tasks 102 may be added to be executed at or near the particular time. However, the device 130 may have available processing and memory resources before the particular time to execute the task 102. The task 102 may wait to be executed at the particular time. But since other tasks 102 are added to be executed at the same or near the particular time, the execution and completion of the tasks 102 may be delayed due to overloading the device 130 and occupying most of processing and memory resources at the task executing device 130.

Thus, the present disclosure provides technical solutions to these technical problems and contemplates the system 100 that is configured to implement dynamic task scheduling so that according to scheduling rules 188 such that execution attributes 180 and device attributes 182 are optimized. Accordingly, the disclosed system 100 is integrated into a practical application of improving the processing and memory utilization of computer systems tasked to execute multiple tasks. The operations of the system 100 are described in greater detail below in conjunction with FIGS. 2-3.

System Components

Network

Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Computing Device

Computing device 120 is generally any device that is configured to process data and interact with users 106. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the scheduling device 170. One or more users 106 may initiate tasks 102 from one or more computing devices 120. The one or more computing devices 120 may communicate the tasks 102 to the scheduling device 170 and/or a block 142 in the blockchain network 140 for processing.

Task Executing Device

Each of task executing devices 130 is generally any device that is configured to process data and communicate with other components of the system 100 via the network 110. Examples of each task executing device 130 include, but are not limited to, a personal computer, a desktop computer, a workstation, a server, a laptop, a tablet computer, a database, a data lake, a data storage infrastructure, etc. The task executing device 130 may include a user interface, such as a display, a microphone, keypad, or other appropriate terminal equipment usable by users. The task executing device 130 may include a hardware processor, memory, and/or circuitry (not explicitly shown) configured to perform any of the functions or actions of the task executing device 130 described herein. For example, a software application designed using software code may be stored in the memory and executed by the processor to perform the functions of the task executing device 130. The task executing device 130 is configured to communicate with other devices via the network 110, such as the scheduling device 170. In the present disclosure, the task executing device 130 is interchangeably referred to herein as a device 130.

The task executing device 130 is tasked to execute or perform a task 102. For example, a task executing device 130 may be a database that stores tables of data, and a task 102 may be to fetch a particular data from the data tables from the task executing device 130. In this example, the task executing device 130 may fetch the particular data from a respective data table and communicate the particular data to another device 130 to perform another task 102, e.g., join operation, query operation on the fetched data, etc.

Blockchain Network

Blockchain network 140 comprises a cloud of computer systems (referred to herein as blocks 142) and is generally configured to keep records of tasks 102 and any other data, and communications and interactions among the blocks 142. The blockchain network 140 may comprise any number of blocks 142. Each block 142 may comprise a computing device, a virtual machine, and/or the like. In the present disclosure, a block 142 may interchangeably be referred to as a network node, a node, or a network device. The blockchain network 140 generally refers to a distributed database (e.g., distributed ledger 160) shared between a plurality of blocks 142 in a network. The system 100 may employ any suitable number of devices (e.g., blocks 142) to form a distributed network that maintains the tasks 102 and their related attributes, e.g., task attributes 166 in form of a blockchain. The blockchain links together the blocks 142 of data which may include the tasks 102 and their related attributes, e.g., task attributes 166.

Each block 142 comprises a blockchain ledger 160 (e.g., stored in the memory 148) that is configured to store a copy of the blockchain ledger 160. The blockchain ledger 160 contains every blockchain transaction 162 executed in a network, task attributes 166 associated with tasks 102, block level information 164, and tasks 102.

The task attributes 166 may include tasks 102, task logs, task schedules, task dependencies, task anomalies, and device attributes 182. Task logs may include recording on performance parameters of the device 130 that executes the task 102 (e.g, memory and resource utilization, memory and resource availability, etc.). Task logs may also include information related to efficiency in completion of each task 102, such as the amount of processing and resources used to execute each task 102. Task logs may also include records of files and/or data needed to execute each task 102 and file and/or data access issues. For example, when a operation 104 of a task 102 had to wait (or be delayed) because it needed to access a particular file from a device 130 but the file could not be accessed due to access restrictions (or the access to the file was delayed due to multiple access requests for the file for other tasks 102), this information is stored in the task logs. Task schedules may include timestamps of receipt, execution duration, and time of completion of each task 102 and each operation 104 of each task 102. Task dependencies may include dependencies of each task 102 with respect to other tasks 102 (if any). For example, if a first task 102 needs to be executed so that a second task 102 can be executed, it means that the second task 102 depends on the first task 102. Task anomalies may include delay in the start time of execution of each task 102, delay in execution of each operation 104 of each task 102, delay in the completion time of each task 102, and other task anomalies. The device attributes 182 are described further below.

The block level information 164 may indicate which data is stored in which block 142. In certain embodiments, each block 142 may store different data (e.g., a different task attribute 166). For example, block 142a may store task logs, block 142b may store task schedules, block 142c may store task anomalies, and block 142d may store device attributes 182. The block level information 164 may include information about which data is stored in a given block 142.

The blockchain 140 links together blocks 142 of data which comprise identifiable units called blockchain transactions 162. Blockchain transactions 162 may comprise information, files, or any other suitable type of data, such as data associated with digital documents, task information, or any other type of information.

Each block 142 in the blockchain 140 comprises a hash value 154 and information derived from a preceding block 142. For example, every block 142 in the blockchain 140 includes a hash 152 of the previous block 142. By including the hash 152, the blockchain 140 comprises a chain of blocks 142 from a genesis block 142 to the current block 142. Each block 142 is guaranteed to come after the previous block 142 chronologically because the previous block's hash 152 would otherwise not be known. In one embodiment, blocks 142 in a blockchain 140 may be linked together by identifying a preceding block 142 with a cryptographic checksum (e.g., secure hash algorithm (SHA)-256) of its contents (e.g. blockchain transactions 162 and additional data stored in the memory 148) which serves as each block's unique identifier. Links are formed by storing the cryptographic checksum identifier of one block 142 in the metadata of another block 142, such that the former block 142 becomes the predecessor of the latter block 142. In this way, the blocks 142 form a chain that can be navigated from block-to-block by retrieving the cryptographic checksum of a particular block's predecessor from the particular block's own metadata. Each block 142 is computationally impractical to modify once it has been in the blockchain 140 because every block 142 after it would also have to be regenerated. These features protect data stored in the blockchain 140 from being modified by bad actors which provides information security.

The blockchain network 140 may include a consensus module (not explicitly shown) that is configured to establish a consensus among the blocks 142 about the present state of the distributed ledger 160. For example, the blockchain network 140 implements a procedure through which all the blocks 142 of the blockchain network 140 reach a common agreement about the present state of the distributed ledger 160. In this way, the consensus module in each block 142 achieves reliability in the blockchain network 140 and establishes trust between the blocks 142 in a distributed computing environment. Essentially, the consensus protocol makes sure that every new block 142 that is added to the blockchain 140 is the one and only version of the truth that is agreed upon by all the nodes 142 in the blockchain 140.

When a block 142 publishes an entry (e.g. a transaction 162, a task 102 in a block 142) in its blockchain ledger 160, the blockchain 140 for all other blocks 142 in the distributed network is also updated with the new entry. Thus, data published in a blockchain 140 is available and accessible to every block 142 with a blockchain ledger 160. This allows the data stored in the block 142 to be accessible for inspection and verification at any time by any device with a copy of the blockchain ledger 160.

Each of the blocks 142a-142d is an instance of a block 142. Each block 142 may comprise a processor 144 in signal communication with a memory 148 and a network interface 146.

Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions 150 to perform one or more functions described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-3.

Network interface 146 is configured to enable wired and/or wireless communications (e.g., via network 110). The network interface 146 is configured to communicate data between the block 142 and other devices (e.g., computing devices 120), scheduling device 170, services, other blocks 142, databases, systems, or domains. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-3 along with any other data, instructions, logic, rules, or code operable to implement the function(s) described herein when executed by processors 144. The memory 148 is operable to store software instructions 150, previous block hash value 152, hash value 154, task analysis machine learning module 156, training dataset 168, blockchain ledger 160, and/or any other data and instructions. The hash value 154 may be used to uniquely identify the corresponding block 142. For example, the hash value 154 may include an alphanumerical string. The hash 152 of the previous block 142 may include a hash value 152 of the previous block 142 generated before the corresponding block 142. The order and place of the block 142 in the blockchain 140 may be determined by the hash 152 of the previous block 142. The software instructions 150 may comprise any suitable set of software instructions, logic, rules, or code operable to execute the processor 144 to perform the functions of the processor 144 and the block 142 described herein.

Each block 142 may include information derived from a preceding block 142. For example, every block 142 in the blockchain includes a hash 152 of the previous block 142. By including the hash 152 of the previous block 142, the blockchain network 140 includes a chain of blocks 142*a* to 142*d* from a genesis block 142*a* (or a block not shown to the left of the block 142*a* in the example of FIG. 1) to the latest block 142*d* (or a block not shown to the right of the block 142*d* in the example of FIG. 1). Each block 142 is guaranteed to come after the previous block 142 chronologically because the previous block's hash value 152 would otherwise not be known.

Task Analysis Machine Learning Module

Task analysis machine learning module 156 may be implemented by the processor 144 executing the software instructions 150, and is generally configured to analyze previous, existing, and incoming tasks 102 and determine the task attributes 166 of each task 102.

In certain embodiments, the task analysis machine learning module 156 may be implemented by a support vector machine, neural network, random forest, k-means clustering, etc. In certain embodiments, the task analysis machine learning module 156 may be implemented by a plurality of neural network layers, convolutional neural network layers, Long-Short-Term-Memory (LSTM) layers, Bi-directional LSTM layers, recurrent neural network layers, and the like. In certain embodiments, the task analysis machine learning module 156 may be implemented by a text processing, natural language processing, and the like. In certain embodiments, the task analysis machine learning module 156 may be implemented by unsupervised, semi-supervised, and/or supervised machine learning techniques.

In a training process, the task analysis machine learning module 156 may observe scheduling of tasks 102 over a period of time (e.g., a few months). For example, the scheduling of the tasks 102 may be indicated by users 106 and/or operators according to certain guidelines. During the training process, the task analysis machine learning module 156 learns the patterns of arrival times for each operation 104 and each task 102, execution times for each operation 104 and each task 102, completion times for each operation 104 and each task 102, delay times for each operation 104 and each task 102, memory resources needed for each operation 104 and each task 102, processing resources needed for each operation 104 and each task 102, and any other information related to the execution of the tasks 102.

The task analysis machine learning module 156 learns the associations and dependencies between tasks 102. The task analysis machine learning module 156 may use this information as a training dataset 168. Based on this information, the task analysis machine learning module 156 determines the task attributes 166. The task analysis machine learning module 156 may store the task attributes 166 in the blockchain ledger 160 to share the task attributes 166 among the blocks 142.

In certain embodiments, the task analysis machine learning module 156 may provide real-time analysis of the tasks 102 and scheduling suggestions 158. In certain embodiments, the task analysis machine learning module 156 may periodically (e.g., every minute, every five minutes, every day, or any other suitable time period) determine whether the scheduling of the tasks 102 can be more optimized based on the task attributes 166, scheduling rules 188, execution attributes 180 and device attributes 182, and provide updated scheduling suggestions 158.

In a testing process, the task analysis machine learning module 156 may use the learned information from the training dataset 168 and provide scheduling suggestions 158 for scheduling any and any number of the incoming and/or currently running tasks 102 to the scheduling device 170. The scheduling suggestions 158 may be determined according to the scheduling rules 188 such that the execution attributes 180 and device attributes 182 are optimized. The scheduling suggestions 158 may be determined so that they do not conflict with task dependencies, access restrictions of each task 102, and other criteria.

For example, the scheduling suggestions 158 may include splitting a task 102 into two or more smaller tasks 102. In this example, assume that the task analysis machine learning module 156 determines that task 102*a* has twenty operations 104*a*, and that a particular operation 104*a* (e.g., the third operation 104*a* from the twenty operations 104*a*) is occupying more than a threshold processing resources and/or a threshold memory resources of the device 130 tasked to perform the task 102*a*. In response, the scheduling suggestion 158 for task 102*a* may indicate to split the task 102*a* into a first sub-task 102*a* and a second sub-task 102*a*, such that the first sub-task 102*a* includes the first two operations 104*a*, and the second sub-task 102*a* includes the rest of the operations 104*a*.

The scheduling suggestion 158 for the task 102*a* may further indicate to schedule the first sub-task 102*a* at a first particular time, schedule another task 102 (e.g., task 102*b*) to be executed at a second particular time after the first particular time, and schedule the second sub-task 102*a* after the other task 102 (e.g., task 102*b*) to be executed at a third particular time after the second particular time, if this scheduling suggestion 158 optimizes the execution attributes 180 and the device attributes 182 according to the scheduling rules 188. Thus, in certain embodiments, the scheduling suggestion 158 may include splitting a task 102 into two or more tasks 102 and scheduling each of the two or more tasks 102 at different times. An example scheduling suggestion 158 for a splitting operation 202 of a task 102 is described in FIG. 2.

In certain embodiments, the scheduling suggestion 158 may include splitting a task 102 into two or more tasks 102, scheduling other tasks 102 to be performed in between the two or more tasks 102.

In another example, a scheduling suggestion 158 may include merging two or more tasks 102. In this example, the scheduling suggestion 158 may indicate to merge the task 102*a* with at least a subset of operations 104*c* of a third task 102*c*. An example scheduling suggestion 158 for a merging operation 204 of two tasks 102 is described in FIG. 2. For example, the scheduling suggestion 158 may indicate to merge the task 102*a* with a subset of operations 104*c* of a third task 102*c*. In another example, the scheduling suggestion 158 may indicate to merge the task 102*a* with all of operations 104*c* of a third task 102*c*. In another example, scheduling suggestions 158 may include splitting a task 102*a*, splitting a task 102*b*, and merging a subset of operations 104*a* with a subset of operations 104*b*.

In another example, scheduling suggestions 158 may include splitting any number and combination of tasks 102*a* to 120*c* and merging any number and combination of operations 104*a* to 104*c*.

In any of the embodiments and examples described herein, a new task 102 may be created as a result of each splitting and merging of the tasks 102. Although certain embodiments and examples are described with three tasks 102a to 102c, the present disclosure contemplates other embodiments where scheduling suggestions 158 include scheduling of any number of tasks 102.

Scheduling Device

Scheduling device 170 is generally a device that is configured to process data and communicate with computing devices (e.g., computing devices 120), blockchain network 140, databases, systems, etc., via the network 110. The scheduling device 170 may be associated with the organization 108. The scheduling device 170 is generally configured to oversee the operations of the processor 172 as described further below in conjunction with the operational flow 200 of system 100 described in FIG. 2 and method 300 described in FIG. 3.

Processor 172 comprises one or more processors operably coupled to the memory 176. The processor 172 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 178) to implement the processor 172. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-3. For example, the processor 172 may be configured to perform one or more operations of method 300 as described in FIG. 3.

Network interface 174 is configured to enable wired and/or wireless communications. The network interface 174 may be configured to communicate data between the scheduling device 170 and other devices, systems, or domains. For example, the network interface 174 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be volatile or non-volatile and may comprise ROM, RAM, TCAM, DRAM, and SRAM. The memory 176 may include one or more of a local database, cloud database, NAS, etc. The memory 176 comprises one or more disks, tape drives, or solid-state drives, and may be used as an over-flow data storage device, to store programs when such programs are selected for execution, and to store instructions and data that are read during program execution.

The memory 176 may store any of the information described in FIGS. 1-3 along with any other data, instructions, logic, rules, or code operable to implement the function(s) described herein when executed by processor 172. For example, the memory 176 may store software instructions 178, tasks 102, scheduling rules 188, execution attributes 180, device attributes 182, scheduling machine learning module 184, tasks 210a-b, task 212, and/or any other data or instructions. The software instructions 178 may comprise any suitable set of instructions, logic, rules, or code operable to execute the processor 172 and perform the functions described herein, such as some or all of those described in FIGS. 1-3.

The execution attributes 180 with respect to each task 102 may include time constraints, time requirements, access requirements to various data needed to perform the respective task 102, dependencies to other tasks 102, processing resource requirements to perform the respective task 102, memory resource requirements to perform the respective task 102 and any other information that impacts the execution of the respective task 102.

The device attributes 182 may include a processing resource availability and a memory resource availability with respect to one or more devices 130 that are tasked to perform the tasks 102.

The scheduling rules 188 may include a time gap between every two adjacent tasks not to be more than a threshold time gap (e.g., more than two seconds, five seconds, thirty seconds, or any other time duration), a memory resource utilization by executing each task 102 not to be less than a threshold memory resource utilization (e.g., less than 60%, 65%, etc.), a processing resource utilization by executing each task 102 not to be less than a threshold processing resource utilization (e.g., less than 60%, 65%, etc. of the CPU utilization), a completion time delay of each task 102 not to be more than a threshold time delay (e.g., more than two seconds, five seconds, thirty seconds, or any other time duration), and a load balancing parameter at the device(s) 130 not to be more than a threshold percentage (e.g., more than 90%, 95%, etc.). The load balancing parameter may comprise a ratio of received load (e.g., tasks 102) over a total load that a device 130 is capable of handling and processing simultaneously. For example, if a device 130 is capable of processing ten tasks 102, and it receives five tasks 102, its load-balancing parameter is 50%.

Scheduling Machine Learning Module

Scheduling machine learning module 184 may be implemented by the processor 172 executing the software instructions 178, and is generally configured to dynamically schedule (and/or revise the scheduling of) any and any number of the existing, currently running, and/or incoming tasks 102 according to the scheduling rules 188 such that the execution attributes 180 and device attributes 182 are optimized.

In certain embodiments, the scheduling machine learning module 184 may be implemented by a support vector machine, neural network, random forest, k-means clustering, etc. In certain embodiments, the scheduling machine learning module 184 may be implemented by a plurality of neural network layers, convolutional neural network layers, LSTM layers, Bi-directional LSTM layers, recurrent neural network layers, and the like. In certain embodiments, the scheduling machine learning module 184 may be implemented by text processing, natural language processing, and the like. In certain embodiments, the scheduling machine learning module 184 may be implemented by unsupervised, semi-supervised, and/or supervised machine learning techniques. In certain embodiments, the scheduling machine learning module 184 may schedule the tasks 102 based on scheduling suggestions 158.

In a training process, the scheduling machine learning module 184 may schedule the tasks 102 based on the scheduling suggestions 158. In this process, the scheduling machine learning module 184 may learn coordination between each task performance and the execution attributes, scheduling attributes 178, and device attributes 182. The scheduling machine learning module 184 may use this information as a training dataset 186.

The scheduling machine learning module 184 may use the training dataset 186 to provide feedback to the task analysis machine learning module 156, so that the task analysis machine learning module 156 updates or revises the scheduling suggestions 158. For example, if a current scheduling of a task 102 is not optimized according to the scheduling rules 188, execution attributes 180, and device attributes 182, the scheduling machine learning module 184 may use the training dataset 186 to learn the reason why the current scheduling of the task 102 is not optimized according to the scheduling rules 188, execution attributes 180, and device attributes 182. The scheduling machine learning module 184 may provide feedback to the task analysis machine learning module 156, so that the task analysis machine learning module 156 updates or revises the scheduling suggestion 158 for the task 102 and/or other tasks 102 so that the scheduling of the task 102 and other tasks 102 are optimized. Example Operational Flow for Implementing Dynamic Task Scheduling FIG. 2 illustrates an example operational flow 200 of system 100 of FIG. 1 for implementing dynamic task scheduling. The operational flow 200 may begin when requests to execute one or more tasks 102 are received, e.g., from one or more users 106 via one or more computing devices 120, similar to that described in FIG. 1. In certain embodiments, the task analysis machine learning module 156 and the scheduling machine learning module 184 are already trained, similar to that described in FIG. 1.

The scheduling device 170 receives the tasks 102. The scheduling device 170 may determine the execution attributes 180 and device attributes 182. The execution attributes 180 may impact the execution of each task 102.

In certain embodiments, a block 142 (e.g., block 142*a*) may determine the execution attributes 180 and device attributes 182. For example, the processor 144 may execute the software instructions 150 to determine the execution attributes 180 and device attributes 182.

The blockchain network 140 receives the tasks 102. For example, the block 142*a* from the blockchain network 140 may receive the tasks 102. The block 142*a* may feed the tasks 102 to the task analysis machine learning module 156. The task analysis machine learning module 156 may determine the task attributes 166 associated with each task 102. The task attributes 166 are described in FIG. 1.

In certain embodiments, the scheduling device 170 may determine the task attributes 166 associated with each task 102. For example, the task analysis machine learning module 156 may be stored in memory 176 of the scheduling device 170, and the scheduling device 170 (e.g., via the task analysis machine learning module 156) may determine the task attributes 166.

The task analysis machine learning module 156 may determine scheduling suggestions 158 for the tasks 102. The scheduling suggestions 158 may include start time, execution duration, completion time, sequence of tasks 102, whether two or more tasks 102 are overlapped, the time gap between two adjacent tasks 102, splitting a task 102, merging two or more tasks 102, among other scheduling suggestions 158.

The task analysis machine learning module 156 communicates the scheduling suggestions 158 to the scheduling device 170. The scheduling device 170 feeds the scheduling suggestions 158 to the scheduling machine learning module 184. The scheduling machine learning module 184 may schedule the tasks 102 according to the scheduling rules 188 such that the execution attributes 180 and device attributes 182 are optimized.

In an example scenario, the scheduling machine learning module 184 may determine that a first task 102*a* is scheduled to be executed. The scheduling machine learning module 184 may determine whether by the current scheduling of the first task 102*a* (e.g., indicated by a user 106), the execution attributes 180 and the device attributes 182 are optimized. For example, the scheduling machine learning module 184 may compare the first task 102*a* with previous or historical tasks 102 that have the same or matching task attributes 166. The scheduling machine learning module 184 may also compare the current scheduling of the first task 102*a* with the historical scheduling of the historical tasks 102 that have the same or matching task attributes 166.

The scheduling machine learning module 184 may determine whether, by the current scheduling of the first task 102*a*, the execution attributes 180 and the device attributes 182 are optimized, based on the comparison between simulated (or expected) results of the current scheduling of the first task 102*a* with results of the historical scheduling of the historical tasks 102 that have the same or matching task attributes 166.

For example, the results of the current scheduling of the first task 102*a* may lead to a particular execution attribute 180 that is not optimal (e.g., more than a threshold delay in the execution of the first task 102*a* due to a delay in accessing a particular file or data that is needed to perform the first task 102*a*).

In another example, the results of the current scheduling of the first task 102*a* may lead to a particular device attribute 182 that is not optimal (e.g., consuming more than a threshold processing and/or memory resources of the device 130 tasked to perform the task 102*a*, causing the processing and/or memory resources availability, performance, and/or utilization to become less than a threshold percentage, e.g., less than 50%, 40%, etc.).
Determining Scheduling Suggestions If the scheduling machine learning module 184 determines that by scheduling the first task 102*a*, at least one of the plurality of execution attributes 180 and the plurality of device attributes 182 is not optimized, the scheduling device 170 (via the scheduling machine learning module 184) may revise or update the current scheduling of the first task 102*a* and/or other tasks 102. In this process, the scheduling machine learning module 184 may revise or update the scheduling of the first task 102*a* and/or other tasks 102 based on the scheduling suggestions 158. The scheduling machine learning module 184 may create a second task 102, such as one or more tasks 210 in a splitting operation 202 or a task 212 in a merging operation 204 described below.

The created second task 102 may include at least a subset of the operations 104*a* of the first task 102*a*. For example, the created second task 102 may include a subset of the operations 104*a* of the first task 102*a*. In another example, the created second task 102 may include all of the operations 104*a* and at least a subset of operations 104 of one or more other tasks 102.

The scheduling machine learning module 184 may schedule the created second task 102 to be executed according to the scheduling rules 188 such that the execution attributes 180 and device attributes 182 are optimized.

Splitting a Task into Two or More Tasks

In certain embodiments, the scheduling suggestion 158 may include a splitting operation 202 of task 102*a*. The task 102*a* has a particular number of operations 104*a* to be completed. In splitting operation 202, the scheduling device 170 feeds the task 102*a* to the scheduling machine learning module 184. The scheduling machine learning module 184 splits the task 102*a* into two or more tasks 210, such as task 210*a* and 210*b*.

Creating the two or more tasks 210 may include (or be in response to) splitting the first task 102*a* into at least a first subset of operations 104*a*-1 and a second subset of operations 104*a*-2. If the task 102*a* is split into tasks 210*a* and 210*b*, the accumulation of operations 104*a*-1 and 104*a*-2 is the total number of operations 104*a*.

Once the two or more tasks 210 are created, the scheduling machine learning module 184 may schedule the two or more tasks 210 according to the scheduling rules 188 such that the execution attributes 180 and device attributes 182 are optimized. In this process, in certain embodiments, the scheduling machine learning module 184 may schedule the task 210*a* that comprises the first subset of operations 104*a*-1 to be executed at a first particular time. The scheduling machine learning module 184 may schedule another one or more tasks 102 to be executed at a second particular time after the first particular time. The scheduling machine learning module 184 may schedule the second task 210*b* that includes the second subset of operations 104*a*-2 to be executed at a third particular time after the second particular time.

In certain embodiments, the scheduling machine learning module 184 may schedule the two or more tasks 210 and other tasks 102 in any sequence that does not conflict with the scheduling rules 188 and where the execution attributes 180 and device attributes 182 are optimized. For example, the scheduling machine learning module 184 may schedule the task 210*a* after the task 210*b*. In another example, the scheduling machine learning module 184 may schedule the task 210*a* before the task 210*b*. In another example, the scheduling machine learning module 184 may schedule the task 210*b*, then one or more tasks 102, then the task 210*a*. In another example, the scheduling machine learning module 184 may schedule the task 210*a*, then one or more tasks 102, then the task 210*b*.

Merging Operation of Two or More Tasks

In certain embodiments, the scheduling suggestion 158 may include a merging operation 204 of two or more tasks 102, e.g., tasks 102*a* and 102*b*. The task 102*a* has a particular number of operations 104*a* to be completed, and the task 102*b* has a particular number of operations 104*b* to be completed. In the merging operation 204, the scheduling device 170 feeds the tasks 102*a* and 102*b* to the scheduling machine learning module 184. The scheduling machine learning module 184 creates a task 212 by merging the tasks 102*a* and 102*b*. The task 212 may have a particular number of operations 214 to be completed.

In certain embodiments, creating the task 212 may include merging at least a subset of operations 104*a* of the task 102*a* with at least a subset of operations 104*b* of the task 102*b*. For example, creating the task 212 may include merging all of the operations 104*a* with all of the operations 104*b*. In another example, creating the task 21 may include a subset of operations 104*a* with all of the operations 104*b*.

In another example, creating the task 212 may include merging a subset of operations 104*a* with a subset of operations 104*b*. In another example, creating the task 212 may include merging all of the operations 104*a* with a subset of operations 104*b*.

In the examples above, the operations 104*a* and 104*b* may be scheduled in any suitable sequence that optimizes the execution attributes 180 and device attributes 182. For example, the operations 104*a* may be scheduled before the operations 104*b*. In another example, the operations 104*b* may be scheduled before the operations 104*a*. In another example, any and any number of operations 104*a* may be scheduled before any and any number of operations 104*b*. In another example, any and any number of operations 104*b* may be scheduled before any and any number of operations 104*a*.

Example Method for Implementing Dynamic Task Scheduling

FIG. 3 illustrates an example flowchart of a method 300 for implementing dynamic task scheduling. Modifications, additions, or omissions may be made to method 300. Method 300 may include more, fewer, or other operations. For example, operations may be performed in parallel or in any suitable order. While at times discussed as the system 100, blockchain network 140, scheduling device 170, or components of any of thereof performing operations, any suitable system or components of the system may perform one or more operations of the method 300. For example, one or more operations of method 300 may be implemented, at least in part, in the form of software instructions 150, 178 of FIG. 1, stored on non-transitory, tangible, machine-readable media (e.g., memories 148, 176 of FIG. 1) that when run by one or more processors (e.g., processors 144, 172 of FIG. 1) may cause the one or more processors to perform operations 302-320.

At 302, the scheduling device 170 accesses a plurality of tasks 102. For example, the scheduling device 170 may access the tasks 102 when the tasks 102 are communicated from the computing device(s) 120.

In certain embodiments, tasks 102 are received by the blockchain network 140. A block 142 (e.g., block 142*a*) may determine the task attributes 166 associated with the tasks 102, similar to that described in FIG. 2. In certain embodiments, the scheduling device 170 may determine the task attributes 166, e.g., when the processor 172 executes the software instructions 178. In this process, the task attributes 166 may be determined by implementing text processing, natural language processing, and/or any data processing algorithm. For example, the scheduling device 170 and/or the block 142*a* may feed the tasks 102 to a neural network to extract features from each task 102, where the features are represented by a vector comprising numerical values. The features may represent task logs, task schedules, task dependencies, task anomalies, among others.

In certain embodiments, the scheduling device 170 and/or the block 142*a* may implement a function implemented in an object-oriented programming language, feed the tasks 102 to the function, where each attribute of each task 102 is treated as an object and determined. For example the attributes of one or more tasks 102 may include times of receipt, dependency to other tasks 102, files and data required to executed the task 102, expected delay times for each operation 104 of each task 102, expected start time, expected execution duration, expected completion time, expected start delay time, expected completion delay time, time gaps between tasks 102, expected processing resources required to perform the task 102, expected memory resources required to perform the task 102, among others. These attributes may be included in the task attributes 166.

At 304, the scheduling device 170 determines execution attributes 180 associated with each of the plurality of tasks 102. In certain embodiments, the scheduling device 170 and/or the block 142a may determine the execution attributes 180 associated with each task 102. Examples of the execution attributes 180 are described in FIG. 2.

At 306, the scheduling device 170 determines device attributes 182 associated with one or more devices 130 tasked to execute the plurality of tasks 102. In certain embodiments, the scheduling device 170 and/or the block 142a may determine the device attributes 182 associated with each task 102. Examples of the device attributes 182 are described in FIG. 2.

At 308, the scheduling device 170 selects a task 102 from among the plurality of tasks 102. The scheduling device 170 may iteratively select a task 102 until no task 102 is left for evaluation.

At 310, the scheduling device 170 determines that the task 102 is scheduled to be executed. For example, the scheduling device 170 determines that the task 102 is scheduled to be executed using current scheduling (e.g., indicated by a user 106) that may not be optimal and/or lead to any of the execution attributes 180 and device attributes 182 not being optimal.

At 312, the scheduling device 170 determines whether at least one of the execution attributes 180 and the device attributes 182 is not optimized by the current scheduling of the task 102. In certain embodiments, the scheduling device 170 may determine that an execution attribute 180 is not optimized if it conflicts with (or violates) the scheduling rules 188. Otherwise, the scheduling device 170 may determine that the execution attribute 180 is optimized. In certain embodiments, the scheduling device 170 may determine that a device attribute 182 is not optimized if it conflicts with (or violates) the scheduling rules 188.

If the scheduling device 170 determines that at least one of the execution attributes 180 and device attributes 182 is not optimized by the current scheduling of the task 102, method 300 proceeds to 316. Otherwise, method 300 proceeds to 314. For example, if it is determined that the execution attributes 180 and device attributes 182 are optimized and scheduling rules 188 are not violated, method 300 proceeds to 314.

At 314, the scheduling device 170 schedules the task 102 to be executed, e.g., according to the current scheduling. The scheduling device 170 may forward the task 102 to the device(s) 130 so that the task 102 may be executed.

At 316, the scheduling device 170 creates a second task 102 that comprises at least a subset of operations 104 of the task 102 based on the execution attributes 180 and device attributes 182. In this process, the scheduling device 170 may create the second task 102 according to the scheduling suggestions 158 determined by the task analysis machine learning module 156. For example, the scheduling device 170 may split the task 102 into two or more tasks 102, merge the task 102 with one or more tasks 102, similar to that described in FIG. 2. For example, the created task 102 may be tasks 210a-b described in FIG. 2. In another example, the created task 102 may be the task 212 described in FIG. 2.

At 318, the scheduling device 170 schedules the second task 102 to be executed according to the scheduling rules 188 such that the execution attributes 180 and device attributes 182 are optimized. The scheduling device 170 may forward the second task 102 to the device(s) 130 so that the second task 102 may be executed.

At 320, the scheduling device 170 determines whether to select another task 102. If the scheduling device 170 determines that at least one task 102 is left for evaluation, method 300 returns to 308. Otherwise, method 300 is terminated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for dynamic task scheduling, comprising:
a memory configured to store:
a plurality of tasks comprising a first task, wherein the first task comprises a first set of operations; and
a set of scheduling rules that indicates requirements for scheduling each of the plurality of tasks;
a set of software instructions associated with a task analysis machine learning algorithm and a scheduling machine learning algorithm; and
a processor operably coupled with the memory, and configured to execute the set of software instructions to:
access the plurality of tasks;
train a task analysis machine learning algorithm on a first training dataset comprising scheduling information of the plurality of tasks, wherein the scheduling information comprises patterns of an arrival time, an execution time, a delay time, and processing resources used to execute a given task;
determine, by the trained task analysis machine learning algorithm, a plurality of execution attributes associated with each of the plurality of tasks, wherein the plurality of execution attributes impacts an execution of each of the plurality of tasks;
determine, by the trained task analysis machine learning algorithm, a plurality of device attributes associated with one or more devices that are tasked to execute the plurality of tasks, wherein the plurality of device attributes impacts the execution of each of the plurality of tasks and a performance of the one or more devices;
train a scheduling machine learning algorithm on a second training dataset comprising the plurality of tasks, with each task being associated with a respective execution attribute and a device attribute;

determine, by the trained scheduling machine learning algorithm a scheduling suggestion to execute the first task;

extract, by the trained task analysis machine learning algorithm, a first set of task attributes from the first task, wherein:

the first set of task attributes is represented by a first vector comprising numerical values; and the first set of task attributes comprises a start time of execution of the first task;

extract, by the trained task analysis machine learning algorithm, a second set of task attributes from a historical task, wherein:

the second set of task attributes is represented by a second vector comprising numerical values; and the second set of task attributes comprises a task anomaly comprising a delay in a start time of execution of the historical task;

simulate, by the trained scheduling machine learning algorithm, an execution of the first task according to the scheduling suggestion by the one or more devices;

compare a first result of the simulated execution of the first task with a second result of the historical task;

determine, based at least on the comparison, that by scheduling the first task, at least one of the plurality of execution attributes and the plurality of device attributes is not optimized; and in response to determining that by scheduling the first task, at least one of the plurality of execution attributes and the plurality of device attributes is not optimized:

determine, by the trained scheduling machine learning algorithm, a reason for the at least one of the plurality of execution attributes and the plurality of device attributes not being optimized;

cause the processor to provide the determined reason as feedback from the trained scheduling machine learning algorithm to the trained task analysis machine learning algorithm stored in the memory, indicating that the at least one of the plurality of execution attributes and the plurality of device attributes is not optimized when the first task is simulated to be executed according to the scheduling suggestion;

refine the trained task analysis machine learning algorithm according to the feedback;

create, by the refined task analysis machine learning algorithm, based at least in part upon the feedback, the plurality of execution attributes, and the plurality of device attributes, a second task that comprises at least a subset of the first set of operations;

update, via the trained scheduling machine learning algorithm, the scheduling suggestion such that the delay in the start time of execution of the first task is reduced;

schedule the second task to be executed according to the updated scheduling suggestion and the set of scheduling rules such that the at least one of the plurality of execution attributes and the plurality of device attributes is optimized; and communicate the second task to a second processor; and the second processor communicatively coupled with the processor, and configured to execute the second task according to the updated scheduling suggestion.

2. The system of claim 1, wherein the plurality of execution attributes with respect to each task comprises at least one of time constraints, access requirements to various data needed to perform each task, dependencies to other tasks, processing resource requirements, and memory resource requirements.

3. The system of claim 1, wherein the plurality of device attributes comprises at least one of a processing resource availability and a memory resource availability with respect to the one or more devices.

4. The system of claim 1, wherein the set of scheduling rules comprises at least one of:

a time gap between every two adjacent tasks not to be more than a threshold time gap;

a memory resource utilization by executing each task not to be less than a threshold memory resource utilization;

a processing resource utilization by executing each task not to be less than a threshold processing resource utilization;

a completion time delay of each task not to be more than a threshold time delay; and a load balancing parameter at the one or more devices not to be less than a threshold percentage.

5. The system of claim 1, wherein:

creating the second task comprises splitting the first task into at least a first subset of operations and a second subset of operations; and scheduling the second task comprises:

scheduling the first subset of operations to be executed at a first particular time;

scheduling another task to be executed at a second particular time after the first particular time; and scheduling the second subset of operations to be executed at a third particular time after the second particular time.

6. The system of claim 1, wherein creating the second task comprises merging the first task with at least a subset of operations of a third task from among the plurality of tasks.

7. The system of claim 1, wherein the first task comprises a web application development, a software application development, or a mobile application development.

8. A method for dynamic task scheduling, comprising:

accessing a plurality of tasks comprising a first task that comprises a first set of operations;

training a task analysis machine learning algorithm on a first training dataset comprising scheduling information of the plurality of tasks, wherein the scheduling information comprises patterns of an arrival time, an execution time, a delay time, and processing resources used to execute a given task;

determining, by the trained task analysis machine learning algorithm, a plurality of execution attributes associated with each of the plurality of tasks, wherein the plurality of execution attributes impacts an execution of each of the plurality of tasks;

determining, by the trained task analysis machine learning algorithm, a plurality of device attributes associated with one or more devices that are tasked to execute the plurality of tasks, wherein the plurality of device attributes impacts the execution of each of the plurality of tasks and a performance of the one or more devices;

training a scheduling machine learning algorithm on a second training dataset comprising the plurality of tasks, with each task being associated with a respective execution attribute and a device attribute;

determining, by the trained scheduling machine learning algorithm, a scheduling suggestion to execute the first task;

extracting, by the trained task analysis machine learning algorithm, a first set of task attributes from the first task, wherein:

the first set of task attributes is represented by a first vector comprising numerical values; and the first set of task attributes comprises a start time of execution of the first task;

extracting, by the trained task analysis machine learning algorithm, a second set of task attributes from a historical task, wherein:

the second set of task attributes is represented by a second vector comprising numerical values; and the second set of task attributes comprises a task anomaly comprising a delay in a start time of execution of the historical task;

simulating, by the trained scheduling machine learning algorithm, an execution of the first task according to the scheduling suggestion by the one or more devices;

comparing a first result of the simulated execution of the first task with a second result of the historical task;

determining, based at least on the comparison, that by scheduling the first task, at least one of the plurality of execution attributes and the plurality of device attributes is not optimized; and in response to determining that by scheduling the first task, at least one of the plurality of execution attributes and the plurality of device attributes is not optimized:

determining, by the trained scheduling machine learning algorithm, a reason for the at least one of the plurality of execution attributes and the plurality of device attributes not being optimized;

causing the processor to provide the determined reason as feedback from the trained scheduling machine learning algorithm to the trained task analysis machine learning algorithm stored in the memory, indicating that the at least one of the plurality of execution attributes and the plurality of device attributes is not optimized when the first task is simulated to be executed according to the scheduling suggestion;

refining the trained task analysis machine learning algorithm according to the feedback;

creating, by the refined task analysis machine learning algorithm, based at least in part upon the feedback, the plurality of execution attributes and the plurality of device attributes, a second task that comprises at least a subset of the first set of operations;

updating, via the trained scheduling machine learning algorithm, the scheduling suggestion such that the delay in the start time of execution of the first task is reduced;

scheduling the second task to be executed according to the updated scheduling suggestion and a set of scheduling rules such that the at least one of the plurality of execution attributes and the plurality of device attributes is optimized, wherein the set of scheduling rules indicates requirements for scheduling each of the plurality of tasks; and executing the second task according to the updated scheduling suggestion.

9. The method of claim 8, wherein the plurality of execution attributes with respect to each task comprises at least one of time constraints, access requirements to various data needed to perform each task, dependencies to other tasks, processing resource requirements, and memory resource requirements.

10. The method of claim 8, wherein the plurality of device attributes comprises at least one of a processing resource availability and a memory resource availability with respect to the one or more devices.

11. The method of claim 8, wherein the set of scheduling rules comprises at least one of:

a time gap between every two adjacent tasks not to be more than a threshold time gap;

a memory resource utilization by executing each task not to be less than a threshold memory resource utilization;

a processing resource utilization by executing each task not to be less than a threshold processing resource utilization;

a completion time delay of each task not to be more than a threshold time delay; and a load balancing parameter at the one or more devices not to be less than a threshold percentage.

12. The method of claim 8, wherein:

creating the second task comprises splitting the first task into at least a first subset of operations and a second subset of operations; and scheduling the second task comprises:

scheduling the first subset of operations to be executed at a first particular time; scheduling another task to be executed at a second particular time after the first particular time; and scheduling the second subset of operations to be executed at a third particular time after the second particular time.

13. The method of claim 8, wherein creating the second task comprises merging the first task with at least a subset of operations of a third task from among the plurality of tasks.

14. The method of claim 8, wherein the first task comprises a web application development, a software application development, or a mobile application development.

15. A non-transitory computer-readable medium storing instructions that when executed by a processor causes the processor to:

access a plurality of tasks comprising a first task that comprises a first set of operations;

train a task analysis machine learning algorithm on a first training dataset comprising scheduling information of the plurality of tasks, wherein the scheduling information comprises patterns of an arrival time, an execution time, a delay time, and processing resources used to execute a given task;

determine, by the trained task analysis machine learning algorithm, a plurality of execution attributes associated with each of the plurality of tasks, wherein the plurality of execution attributes impacts an execution of each of the plurality of tasks;

determine, by the trained task analysis machine learning algorithm, a plurality of device attributes associated with one or more devices that are tasked to execute the plurality of tasks, wherein the plurality of device attributes impacts the execution of each of the plurality of tasks and a performance of the one or more devices;

train a scheduling machine learning algorithm on a second training dataset comprising the plurality of tasks, with each task being associated with a respective execution attribute and a device attribute;

determine, by the trained scheduling machine learning algorithm, a scheduling suggestion to execute the first task;

extract, by the trained task analysis machine learning algorithm, a first set of task attributes from the first task, wherein:

the first set of task attributes is represented by a first vector comprising numerical values; and the first set of task attributes comprises a start time of execution of the first task;

extract, by the trained task analysis machine learning algorithm, a second set of task attributes from a historical task, wherein:

the second set of task attributes is represented by a second vector comprising numerical values; and the second set of task attributes comprises a task anomaly comprising a delay in a start time of execution of the historical task;

simulate, by the trained scheduling machine learning algorithm, an execution of the first task according to the scheduling suggestion by the one or more devices;

compare a first result of the simulated execution of the first task with a second result of the historical task;

determine, based at least on the comparison, that by scheduling the first task, at least one of the plurality of execution attributes and the plurality of device attributes is not optimized; and in response to determining that by scheduling the first task, at least one of the plurality of execution attributes and the plurality of device attributes is not optimized:

determine, by the trained scheduling machine learning algorithm, a reason for the at least one of the plurality of execution attributes and the plurality of device attributes not being optimized;

cause the processor to provide the determined reason as feedback from the trained scheduling machine learning algorithm to the trained task analysis machine learning algorithm stored in the memory, indicating that the at least one of the plurality of execution attributes and the plurality of device attributes is not optimized when the first task is simulated to be executed according to the scheduling suggestion;

refine the trained task analysis machine learning algorithm according to the feedback;

create, based at least in part upon the feedback, the plurality of execution attributes and the plurality of device attributes, a second task that comprises at least a subset of the first set of operations;

update, via the trained scheduling machine learning algorithm, the scheduling suggestion such that the delay in the start time of execution of the first task is reduced;

schedule the second task to be executed according to the updated scheduling suggestion and a set of scheduling rules such that the at least one of the plurality of execution attributes and the plurality of device attributes is optimized, wherein the set of scheduling rules indicates requirements for scheduling each of the plurality of tasks; and execute the second task according to the updated scheduling suggestion.

16. The non-transitory computer-readable medium of claim 15, wherein the plurality of execution attributes with respect to each task comprises at least one of time constraints, access requirements to various data needed to perform each task, dependencies to other tasks, processing resource requirements, and memory resource requirements.

17. The non-transitory computer-readable medium of claim 15, wherein the plurality of device attributes comprises at least one of a processing resource availability and a memory resource availability with respect to the one or more devices.

18. The non-transitory computer-readable medium of claim 15, wherein the set of scheduling rules comprises at least one of:

a time gap between every two adjacent tasks not to be more than a threshold time gap;

a memory resource utilization by executing each task not to be less than a threshold memory resource utilization;

a processing resource utilization by executing each task not to be less than a threshold processing resource utilization;

a completion time delay of each task not to be more than a threshold time delay; and a load balancing parameter at the one or more devices not to be less than a threshold percentage.

19. The non-transitory computer-readable medium of claim 15, wherein:

creating the second task comprises splitting the first task into at least a first subset of operations and a second subset of operations; and scheduling the second task comprises:

scheduling the first subset of operations to be executed at a first particular time;

scheduling another task to be executed at a second particular time after the first particular time; and scheduling the second subset of operations to be executed at a third particular time after the second particular time.

20. The non-transitory computer-readable medium of claim 15, wherein creating the second task comprises merging the first task with at least a subset of operations of a third task from among the plurality of tasks.

* * * * *